(12) United States Patent
Flannery (10) Patent No.: US 12,199,258 B2
(45) Date of Patent: Jan. 14, 2025

(54) SUPPORT STRUCTURE FOR A DUCT (71) Applicant: Xerotech Limited, Oranmore (IE)

(72) Inventor: Barry Flannery, Oranmore (IE)

(73) Assignee: Xerotech Limited, Galway (IE)

( * ) Notice: Subject to any disclaimer, the term of this patent is extended or adjusted under 35 U.S.C. 154(b) by 652 days.

(21) Appl. No.: 17/291,496

(22) PCT Filed: Oct. 18, 2019

(86) PCT No.: PCT/EP2019/078462
§ 371 (c)(1),
(2) Date: May 5, 2021

(87) PCT Pub. No.: WO2020/094366
PCT Pub. Date: May 14, 2020

(65) Prior Publication Data
US 2022/0006135 A1    Jan. 6, 2022

(30) Foreign Application Priority Data
Nov. 5, 2018  (GB) .................................... 1818053

(51) Int. Cl.
| | | |
|---|---|---|
| *H01M 10/6557* | (2014.01) |
| *F28F 1/08* | (2006.01) |
| *F28F 21/06* | (2006.01) |
| *H01M 10/0525* | (2010.01) |
| *H01M 10/613* | (2014.01) |
| *H01M 10/615* | (2014.01) |
| *H01M 10/617* | (2014.01) |

(Continued)

(52) U.S. Cl.
CPC ........... *H01M 10/6557* (2015.04); *F28F 1/08* (2013.01); *F28F 21/062* (2013.01); *H01M 10/0525* (2013.01); *H01M 10/613* (2015.04); *H01M 10/615* (2015.04); *H01M 10/617* (2015.04); *H01M 10/625* (2015.04); *H01M 10/643* (2015.04); *H01M 10/653* (2015.04); *H01M 10/6568* (2015.04); *H01M 10/658* (2015.04); *H01M 50/213* (2021.01); *F28F 2255/02* (2013.01); *H01M 2220/20* (2013.01)

(58) Field of Classification Search
None
See application file for complete search history.

(56) References Cited

U.S. PATENT DOCUMENTS 3,897,923 A * 8/1975 Paepke .................. F16L 3/003
248/75
5,899,077 A   5/1999 Wright et al.
(Continued)

FOREIGN PATENT DOCUMENTS

DE    10 2014 224165      6/2016
JP       2018200076 A  * 12/2018

OTHER PUBLICATIONS

Abstract of JP 2018200076A (Year: 2018).*
(Continued)

*Primary Examiner* — Gregg Cantelmo
(74) *Attorney, Agent, or Firm* — Amundsen Davis, LLC (57) ABSTRACT

A support structure 1 for a flexible, heat-exchanging duct of the type that is locatable proximal to cells 4 of a battery pack for thermally managing the battery pack. The support structure 1 is configured to provide support to a duct to prevent the duct kinking when the duct changes direction.

21 Claims, 9 Drawing Sheets

(51) Int. Cl.
 H01M 10/625 (2014.01)
 H01M 10/643 (2014.01)
 H01M 10/653 (2014.01)
 H01M 10/6568 (2014.01)
 H01M 10/658 (2014.01)
 H01M 50/213 (2021.01)

(56) References Cited

U.S. PATENT DOCUMENTS

| | | | | |
|---|---|---|---|---|
| 6,125,891 | A | * | 10/2000 | Witmer .................... F16L 9/10 |
| | | | | 285/134.1 |
| 6,460,520 | B1 | * | 10/2002 | Challis .................... F28D 7/16 |
| | | | | 60/617 |
| 2006/0027356 | A1 | | 2/2006 | Sulzer |
| 2017/0055369 | A1 | * | 2/2017 | Woolard ........... H05K 7/20927 |

OTHER PUBLICATIONS

PCT/EP2019/078462 International Search Report and Written Opinion of the International Searching Authority dated Feb. 6, 2020 (9 pages).

PCT/EP2019/078462 International Preliminary Report on Patentability dated Oct. 26, 2020 (13 pages).

* cited by examiner

SUPPORT STRUCTURE FOR A DUCT

CROSS REFERENCE TO RELATED APPLICATIONS

This application is a nationalization of and claims priority to PCT/EP2019/078462, filed on Oct. 18, 2019, which claims priority to GB1818053.9, filed on Nov. 5, 2018, the disclosures of each of which are hereby incorporated by reference in their entirety.

The present disclosure relates to supporting a flexible duct such as an inflatable duct used in a battery pack thermal management system.

The key requirements for next-generation battery packs, in particular, lithium-ion batteries for mobility applications are improved gravimetric and volumetric energy density, improved cycle life and fast-charging. Gravimetric and volumetric energy densities are largely improved through advances in cell electrochemistry and chemical engineering. However, improvements in the mechanical design of the battery pack can also have an appreciable impact on the overall weight and size of the battery pack.

The battery pack mechanical design impacts cycle life and fast-charging capability mainly through the thermal management system. It is desirable to minimise temperature variations across a battery pack to prevent differential cell aging which, ultimately, results in reduced cycle life. Furthermore, it is important to maintain a relatively constant temperature of 25° C. throughout the battery pack to maximise cell lifetime. The latter is particularly challenging to maintain during fast-charging due to the high heat generation within the battery pack.

Heat exchangers involving a flexible duct arranged around cells in a serpentine formation are known and are typically utilised with prismatic cells, because the planar surfaces of prismatic cells provide a large surface area for thermal contact with the duct. It is easy to wrap a duct around prismatic cells in a serpentine manner while maintaining thermal contact in this way. However, one problem with this solution is that the duct is susceptible to kinking at points of inflection where it reverses or changes direction.

Kinking of the duct can cause blockages and a build-up of pressure in the heat exchanger. Blockages can hinder or prevent the flow of coolant, hence undermining the purpose of the heat exchanger. A build-up of pressure can result in the wall of the duct stretching and thinning, which may ultimately result in the duct bursting and hence losing coolant.

Another problem with a duct arranged in a serpentine formation around cells is that it must follow a more tortuous path to maintain thermal contact with a battery or array of cylindrical cells which present an uneven, undulating contact surface to the duct. This makes it more difficult to establish effective thermal contact and more challenging to assemble the battery unit. It may also worsen the problem of kinking where the heat exchanger reverses direction between each limb or section of the serpentine shape.

It is an object of the invention to obviate or mitigate the aforementioned problems with heat exchangers for battery packs having an array of cells.

It is a further object of the invention to obviate or mitigate the occurrence of kinking in flexible ducts in battery packs having an array of cells.

According to a first aspect of the present invention there is provided a support structure for a flexible, heat-exchanging duct of the type that is locatable proximal to cells of a battery pack, the support structure being configured to provide support to a duct to prevent kinking, bulging and/or bursting of the duct when the duct changes direction. Advantageously, the support structure reduces the risk that blockages may form at points where the duct changes direction. Where the duct is part of a thermal management arrangement of a battery pack, preventing kinking reduces pressure losses within the thermal management arrangement, improving the flow rate of fluid through the duct and the thermal management arrangement.

Ideally, the support structure may comprise a channel configured to guide the duct. Locating the duct within a channel is advantageous as the channel guides the duct at points where the duct reverses direction thus preventing the duct kinking. Furthermore, the channel provides support to the duct on both sides which prevents the duct bulging and potentially bursting.

Preferably, the support structure may comprise at least one recess or opening configured to partially receive the duct in an uninflated state such that slack is created in the duct. Beneficially, providing the duct with excess slack helps prevent the duct kinking when the duct is inflated. This is because as the duct is inflated it comes under tension and the excess slack helps to prevent excess tension building in the duct.

At least a part of the support structure may be configured to provide a thermal barrier between at least one cell and the duct when in use. This is beneficial because it is important to maintain a constant temperature distribution across the battery pack in order to prolong the life of the battery. By thermally insulating a cell at a location where there is too much thermal contact between the duct and the cell, the thermal contact between the duct and the cells is kept substantially constant throughout the battery pack. This in turns promotes a constant temperature distribution across the battery pack.

Preferably, the support structure is configured to be located within the battery pack at positions where the duct changes direction, such as at the edge portion of the battery pack where the duct emerges from the array of cells and reverses direction.

Ideally, the support structure defines a guide path for a flexible duct. The guide path may be a slot or channel into which a flexible duct may be inserted and that the flexible duct then follows so as to change direction without kinking, or it could be one or more structures that urge the flexible duct into a predetermined path when it is fixed into position in the battery pack. The guide path is configured such that the duct follows the guide path from the point the duct emerges from the array to the point that the duct re-enters the array when in use. The guide path prevents the duct bulging or contacting the cells located at the edge of the array any more than a cell located within the array.

Ideally, the support structure has an inner guide formation. Ideally, the inner guide formation is locatable on the inside of the turn of a flexible duct when in use. Preferably, the inner guide formation has an inner support face that is located between a cell and the flexible duct when in use.

Ideally, the support structure has an outer guide formation, the outer guide formation having an outer supporting face. Preferably, at least part of the guide path of the support structure is defined between the inner supporting face of the inner guide formation and the outer supporting face of the outer guide formation. The inner support face and/or the outer support face may be continuous or discontinuous.

Ideally, the support structure, most preferably the guide path, is shaped to accommodate an excess length of the flexible duct. Providing the flexible duct with excess length creates some slack that mitigates kinking when the flexible duct is inflated and so comes under tension. By "shaped to accommodate" it is meant that a portion of the guide path may be widened to accommodate the duct, or there may be a gap in the inner or outer guide formations to enable a person fitting the duct to position an excess length of the duct through the gap. The flexible duct is inserted into the guide path in an uninflated state for ease of assembly.

Preferably at least a part of the support structure is compressible. In its inflated state, the duct tends to pull in the direction of any bend within it due to tensioning. Advantageously, by making at least a part of the support structure compressible allows the surface that the duct pulls against to yield slightly such the duct volume is prevented from kinking shut at the bend.

Ideally, the inner guide formation, most preferably, at least part of the inner support face, is compressible. Ideally, the inner guide formation comprises a compressible foam.

Preferably, the support structure is adapted to guide a flexible duct smoothly through one or more 90° bends. Ideally, the inner guide formation is dimensioned such that the bend radius of the inner supporting face is large enough to guide the flexible duct smoothly through at least 90°, most preferably 180°, without the duct kinking. The inner supporting face may comprises a planar elongate facet. The inner supporting face may comprise one or more radiused edges adjacent to the planar elongate facet. The inner supporting face may comprises a planar elongate facet between two radiused edges. Advantageously, the elongate face can straighten and support the flexible duct at the point at which kinking would otherwise be most likely.

The support structure may comprise notch-like recesses in the outer guide formation opposite the radiused edges. Ideally, the notch-like recesses form part of the outer supporting face to accommodate the slack defined by the excess length of the flexible duct. Slack portions of the flexible duct that bend around the radiused edges can be pulled or pushed away from the radiused edges and into the recesses. Pressing the flexible duct into the recesses in this way before inflating the flexible duct creates slack in the flexible duct at the radiused edges. Providing this slack in the flexible duct before inflation is advantageous as it helps to mitigate kinking of the duct as it is inflated.

Ideally, the notch-like recesses are recesses in the outer supporting face of the outer guide formation and may be any shape suitable for partially receiving the duct to create slack around the radiused edges.

Preferably, the support structure is dimensioned such that the cells positioned on the end of each row of the array have substantially the same thermal contact area with the duct as cells located in the centre of the array when in use. This is advantageous as it promotes a more even temperature distribution throughout the battery pack thereby extending the life of the battery pack. The support structure achieves this by shielding or thermally insulating a portion of the end cells from thermal contact with the duct such that the duct has substantially the same thermal contact area with the end cells as cells located within the array.

Preferably, the support structure is shaped such that at least one end of the outer supporting face abuts a cell when in use. The support structure may be shaped such that one end of the outer supporting face abuts one cell and the other end of the outer support face abuts another cell, such that the outer bend of the guide path is defined by the outer supporting face from the point the duct emerges from the array to the point that the duct re-enters the array. The outer supporting face prevents the duct expanding such that it wraps around the exterior of the cells which would cause the end cell to have an increased thermal contact with the duct.

Ideally, the support structure is shaped such that one end of the inner supporting face abuts an end cell when in use. The end of the inner supporting face in abutment with the end cell provides support to the duct thereby preventing the end cell bulging and wrapping around the end cell. Preferably, the support structure is shaped such that the other end portion of the inner supporting face partially follows the surface of another end cell such that the end portion wraps around the end cell to form a thermal insulating barrier when in use.

Ideally, the support structure is shaped such that the end portion of the inner supporting face partially wraps around the exterior surface of the end cell such that when the duct is located within the guide path the duct does not contact the end cell in the region of the end portion when in use.

The support structure may be formed from a block of solid material. Ideally, the support structure comprises a plurality of spaced apart guide paths, most preferably, extending through the block. As the support structure has a plurality of guide paths, the duct can be arranged extending through a first guide path, along a first row of cells, back along a second row of cells adjacent the first row, and into a second guide path of the same support structure. Advantageously, a single support structure can be used to support the duct in more than one location about the battery pack as the duct is arranged around the cells of the battery pack.

Ideally, the support structure comprises an inner thermally-insulating block. Preferably, the inner thermally-insulating block extends away the inner guide formation and it may be integrally formed with the inner guide formation, most preferably, from the inner supporting face. This further improves the thermal management properties of the duct. Preferably, the support structure comprises an outer thermally-insulating block that extends away from the outer guide formation, most preferably, from the outer supporting face. The outer thermally-insulating block may be integrally formed with the outer guide formation. The support structure thereby supports the duct in multiple locations and also thermally-insulates the battery pack.

Preferably, at least part of the support structure is integrally formed with a battery pack housing. Most preferably, at least part of the support structure is integrally formed with a lower clamshell of a battery pack housing, or an upper casing of a battery pack housing.

Preferably, at least part of the battery pack housing forms part of the support structure. Most preferably, at least part of an inner sidewall of the battery pack housing is used to support the flexible duct.

According to another aspect of the present invention there is provided a housing of a battery pack, the housing comprising a support structure configured to provide support to a flexible, heat-exchanging duct, the support structure being configured to prevent kinking of the duct when the duct changes direction.

According to another aspect of the present invention there is provided a battery pack, the battery pack comprising a plurality of cells and a support structure configured to provide support to a flexible duct, the flexible duct being arrangeable between the cells to thermally manage the cells, the support structure being configured to prevent kinking of the duct when the duct changes direction.

According to another aspect of the present invention there is provided a thermal management arrangement for a battery pack, wherein the battery pack comprises a plurality of cells, the thermal management arrangement comprising a flexible duct configured to be placed around cells of a battery pack and to carry a fluid, the thermal management arrangement further comprising a support structure configured to provide support to the flexible duct to prevent the duct kinking when the duct changes direction.

The duct may be configured to carry fluid such as air or a coolant fluid.

Ideally, the duct is pressurised by the fluid to an inflated state and wherein when in the inflated state the duct is in conformity with the surface of the cells.

Advantageously, inflating the duct causes the duct to expand and conform to the shape of the cells. This improves the thermal contact between the duct and the cells such that the fluid may transfer thermal energy between the fluid and the cells more efficiently.

The duct may secure the cells in position when in the inflated state. This is advantageous as it improves the connection of the cells in the battery pack. Furthermore, when the battery pack is being used in an automotive or aerospace application where it is subject to vibration, the duct may reduce the effects of vibrations on the battery pack by securing the individual cells in place.

The thermal management arrangement may comprise a potting means. The potting means may be an epoxy resin. The potting means may set rigid such that it may secure the cells and the duct in position within the battery pack.

The potting means may comprise a foam such as thermally insulating foam or polyurethane foam. Beneficially the thermally insulating foam may prevent a high energy thermal event propagating through the battery pack. Furthermore, the thermally insulating foam reduces the effect of external temperature fluctuations on the battery pack and helps to ensure that the duct is the primary controller of thermal energy within the battery pack.

The thermally insulating foam may be expandable and set rigid, which may secure the components within the battery pack in position. This is advantageous as it reduces the effects of vibrations on components within the battery pack. Furthermore, the rigid foam acts as a support for the duct. When the foam sets rigid it may surround the duct thus preventing excessive expansion and potentially, bursting of the duct. The thermally insulating foam may define a cavity within which the duct is located.

The thermally insulating foam may act as an adhesive. The thermal management arrangement may comprise an outer casing for the battery pack. Ideally, the thermally insulating foam may secure the outer casing to the battery pack by adhering the outer casing to the battery pack. This beneficially reduces or negates the requirement for additional fixings or fasteners which reduces the complexity of the battery pack and improves the manufacturing process. The thermally insulating foam may be a polyurethane foam.

The duct may be formed from an inflatable plastics material. The inflatable plastics material may be low-density polyethylene (LDPE), linear low-density polyethylene (LLDPE) or high-density polyethylene (HDPE). An inflatable plastics material is advantageous as the material is intrinsically electrically insulating, lightweight and does not corrode or chemically interact with a coolant such as a glycol water mix. Furthermore, the inflatable plastics material may be made very thin which allows for good thermal transfer properties between the duct and the cells. For example, the duct wall may be between 50 μm and 150 μm thick.

The thermal management arrangement may comprise a reservoir in fluid communication with the duct. Ideally, the thermal management arrangement comprises a coolant loop. Ideally, the coolant loop is in fluid communication with the reservoir. The reservoir may comprise a coolant fluid and the reservoir may provide hydrostatic pressure to coolant fluid in the coolant loop. The thermal management arrangement may comprise a pump for pumping fluid through the duct. Ideally, the pump may be configured to pump coolant from the reservoir to the coolant loop to pressurise the coolant loop. Advantageously, coolant fluid in the reservoir may be used to pressurise the thermal management arrangement. Beneficially this allows the pressure to be maintained within the thermal management arrangement such that the pressure is maintained at a target operating pressure. The thermal management arrangement may comprise a pressure sensor to monitor the pressure of the fluid such that a target operating pressure is maintained.

The cells may be cylindrical cells. The thermal management arrangement is well suited for use with cylindrical cells as the duct can expand and conform to the undulating surface of the cylindrical cells. This is advantageous as it improves the thermal contact between the cells and the duct.

The cells may be size 18650 or 2170 cells. The height of the support structure may be substantially equal to the height of the cells. The height of the duct, in its inflated state, may be equal to or less than the height of the cells.

The duct may be a multi-lumen duct. The multi-lumen duct may comprise two or more lumens along which coolant fluid may flow. A multi-lumen duct may be used in large battery packs where a single lumen duct is not capable of promoting an even temperature distribution. Advantageously, a multi-lumen duct may be used in combination with the support structure as described above to prevent the multi-lumen duct kinking. Furthermore, the multi-lumen duct may be pressurised such that it expands and conforms to the cells in a similar manner to that of the single lumen duct.

Preferably the duct material comprises a matrix and a filler. Ideally the thermal conductivity of the filler is greater than the thermal conductivity of the matrix. Advantageously, the inclusion of filler within the matrix increases the thermal conductivity of the duct material.

Preferably the matrix is a flexible matrix.
Preferably the matrix is electrically insulating.
Preferably the matrix is a plastic matrix.
Preferably the matrix is a polymer matrix.
Preferably the matrix is a low-density polyethylene (LDPE) matrix, linear low-density polyethylene (LLDPE) matrix. high-density polyethylene (HDPE) matrix, polyester, silicone or rubber matrix.

Preferably the matrix has a thermal conductivity less than 15 Wm-1 K-1, less than 10 Wm-1 K-1, less than 5 Wm-1K-1 and/or less than 1 Wm-1 K-1.

Preferably the filler comprises particles of a filler material.
Preferably the particles of filler material are dispersed throughout the matrix.
Preferably the particles of filler material have an average diameter of between 1 nm and 10 μm.
Preferably the particles of filler material have an elongate, tubular, fiber or substantially spherical shape.
Preferably the elongate particles of filler material have a diameter of 1-10 nm and optionally a length of 0.5-5 nm.
Preferably the filler comprises an organic filler material.
Preferably the filler comprises a carbon-based filler material such as carbon, carbon black, graphite, graphite platelets graphene, multi-walled carbon nanotubes or single-wall carbon nanotubes.
Optionally the filler comprises an inorganic filler material.
Optionally the filler comprises a ceramic filler material such as aluminium oxide, silicon carbide, boron nitride, silicon nitrate, alumina, aluminium nitride or zinc oxide.

Preferably the filler has a thermal conductivity greater than 10 Wm-1 K-1 and/or greater than 100 Wm-1K-1.

Preferably the duct material comprises less than 25% by volume of filler, 5-18% by volume of filler or 15% by volume of filler. Advantageously, incorporating a limited amount of filler into the matrix provides an increased thermal conductivity while maintaining a low electrical conductivity and suitable flexibility of the material.

Preferably the duct material has a thermal conductivity greater than 0.33 Wm-1 K-1 at room temperature, greater than 1 Wm-1 K-1 at room temperature and/or greater than 10 Wm-1 K-1 at room temperature.

One or more embodiments of the invention will now be described, by way of example only, with reference to the accompanying drawings, in which.

Figure 1:
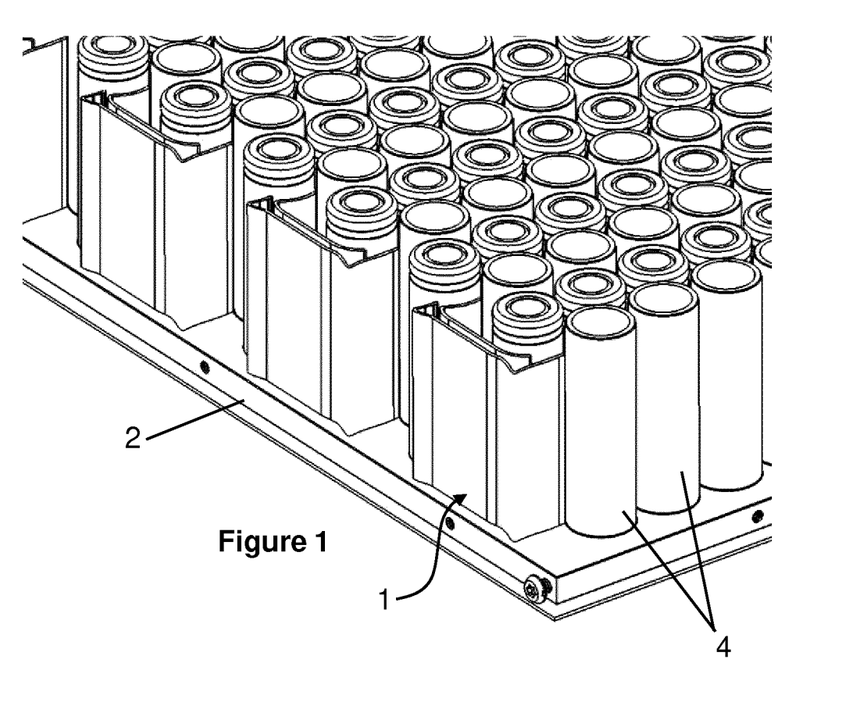
FIG. 1 is an enlarged perspective view showing a plurality of support structures fitted at the peripheral edge of an array of cells.
Figure 2:
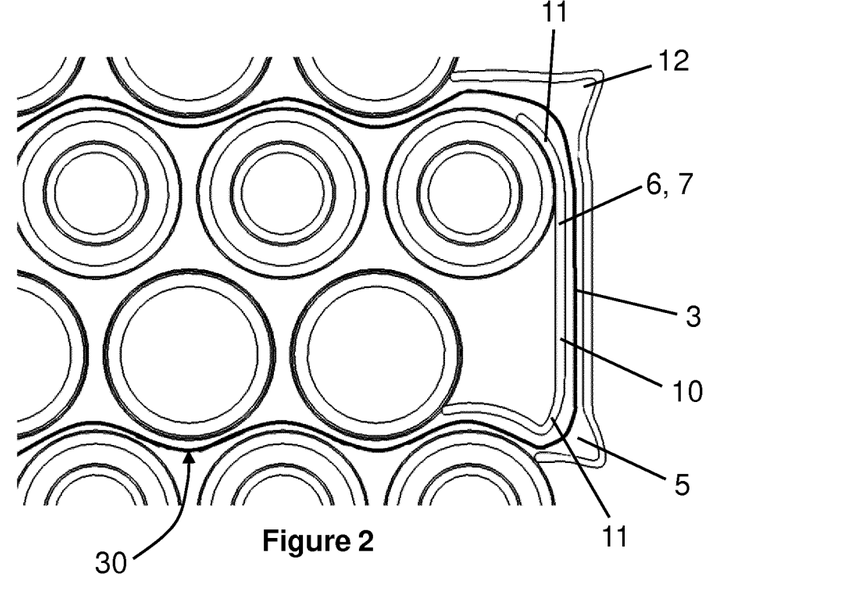
FIG. 2 is an enlarged plan view of the support structure and a flexible duct in an uninflated state.
Figure 3:
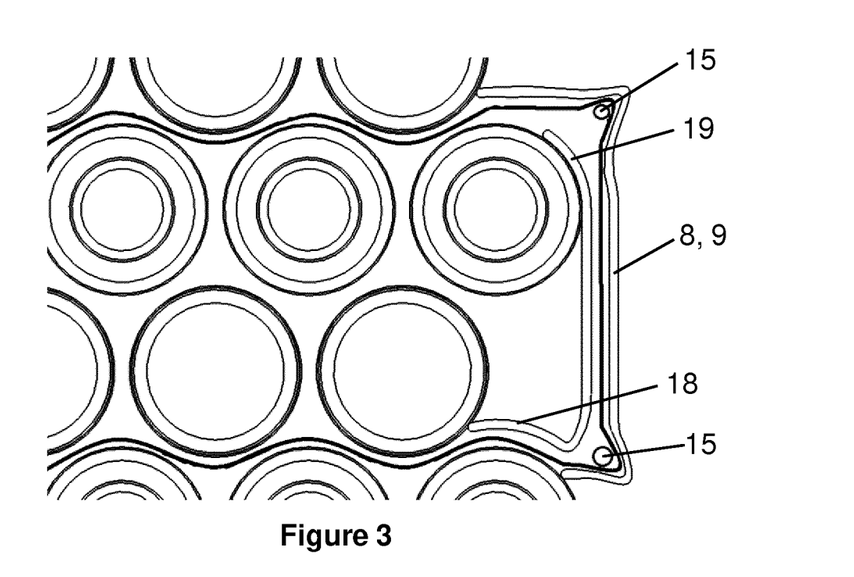
FIG. 3 is an enlarged plan view of the support structure and a flexible duct being located in position.
Figure 4:
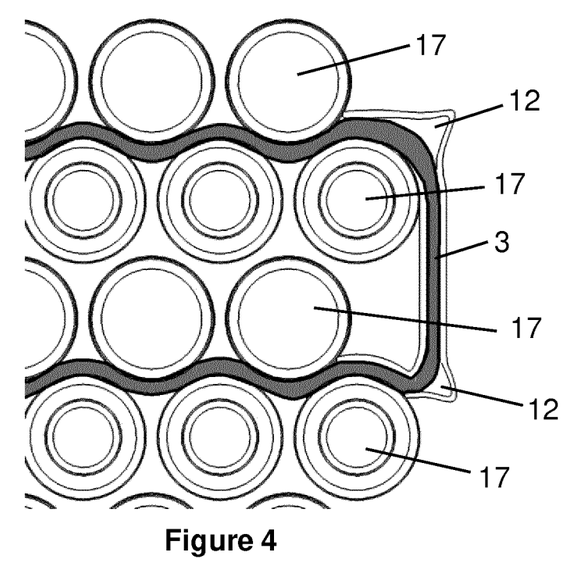
FIG. 4 is an enlarged plan view of the support structure and a flexible duct in an inflated state.

In the drawings there is shown a support structure for a duct according to the invention, indicated generally by reference numeral 1. In FIG. 1 the support structure 1 is illustrated in situ in a battery pack 2, in particular, on a lower clamshell of the battery pack 2. The support structure 1 can be used as a guide for a flexible duct 3, as shown in FIGS. 2 to 4, in particular, where the duct 3 changes direction.

The support structure 1 is used to prevent the duct 3 kinking, bulging and/or bursting when the duct changes direction. Kinking of the duct 3 can result in the flexible duct 3 folding in on itself and creating blockage(s) within the duct 3. Blockages due to kinking can be overcome by pressurising the coolant fluid within the duct 3 sufficiently to overcome the kinking and to force the flexible duct 3 open. However, use of excessive pressure is undesirable as the pressure required to overcome the kinking effect may cause the flexible duct 3 to stretch, hence causing the walls of the duct 3 to thin and potentially burst. Furthermore, the pressure loss within the system due to kinking over a series of multiple bends may be significant, reducing the overall performance of the thermal management arrangement.

The pressure required to overcome the problem of kinking at each bend in a flexible duct 3 is often in excess of the pressure that the flexible duct 3 can withstand without bursting. The internal pressure within the duct 3 is limited by the tensile strength of the inflatable tube and, consequently, its maximum inflated diameter. The support structure 1 limits the maximum diameter of the duct 3 and also provides direct mechanical support to the duct 3, particularly at places where the duct 3 changes direction.

Kinking of the duct 3 is most prone at points where the duct 3 changes direction. As such, the support structures 1 are located at the edge of the battery pack 2 where the flexible duct 3 emerges from the array of cells 4 and reverses direction. FIG. 1 shows the support structures 1 positioned on the battery pack 2 at the periphery of the cells 4. The support structures 1 are positioned along opposing sides of the battery pack 2 at each point the duct 2 emerges from the array of cells 4. As is explained in further detail below, the support structures 1 can be made from any suitable rigid, semi-rigid or compressible material which has sufficient rigidity to support the flexible duct, for example metal, plastic, rubber, or a potting material such as an epoxy resin or polyurethane foam.

Respective support structures 1 are positioned at opposing sides of the battery pack 2 to guide the flexible duct 3 where the flexible duct 3 emerges from the array of cells 4 and changes direction. For this purpose, the support structure 1 defines a guide path 5 for the flexible duct 3. The guide path 5 is a slot or channel into which the flexible duct 3 may be inserted and that the flexible duct 3 then follows so as to change direction without kinking. The guide path 5 of the support structure 1 is defined between an inner supporting face 7 of an inner guide formation 6 and an outer supporting face 9 of an outer guide formation 8 as shown in FIG. 2. A base extends between the inner guide formation 6 and the outer guide formation 8 thereby connecting them.

The flexible duct 3 is first inserted into the support structure 1 in an uninflated state to follow the guide path 5. The guide path 5 is shaped to accommodate an excess length of the flexible duct 3. Providing the flexible duct 3 with excess length creates some slack that mitigates kinking when the flexible duct 3 is inflated and so comes under tension. The flexible duct 3 is inserted into the guide path 5 in an uninflated state for ease of assembly. However, the skilled reader will appreciate that a small amount of working fluid may be used to pressurise the flexible duct 3 to give the flexible duct 3 some stiffness to aid assembly. The working fluid may be, for example, air or a coolant fluid.

The inner guide formation 6, more specifically the inner support face 7, may be formed from a compressible material such as polymeric foam or rubber, where the duct 3 contacts the inner guide formation 6 when inflated. The inner guide formation 6 is dimensioned such that the bend radius of the inner supporting face 7 is large enough to guide the flexible duct 3 smoothly through 180° in successive 90° bends without the duct 3 kinking. As shown in FIG. 2, the inner supporting face 7 comprises a planar elongate facet 10 between two radiused edges 11. The elongate facet 10 serves to straighten and support the flexible duct 3 at the point at which kinking would otherwise be most likely.

Notch-like recesses 12 in the outer guide formation 8 opposite the radiused edges 11 form part of the outer supporting face 9 to accommodate the slack defined by the excess length of the flexible duct 3. Specifically, slack portions of the flexible duct 3 that bend around the radiused edges 11 can be pulled or pushed away from the radiused edges 11 and into the recesses 12. Pressing the flexible duct 3 into the recesses 12 in this way before inflating the flexible duct 3 creates slack in the flexible duct 3 at the radiused edges 11. Providing this slack in the flexible duct 3 before inflation is advantageous as it helps to mitigate kinking of the duct 3 as it is inflated.

The notch-like recesses 12 are recesses in the outer supporting face 9 of the outer guide formation 8 and may be any shape suitable for partially receiving the duct 3 to create slack around the radiused edges 11.

FIG. 3 shows the flexible duct 3 located within the guide path 5 of the supporting structure 1 in an uninflated state. When the flexible duct 3 is first located within the guide path 5 an elongate rod or tool 15 may be used to locate the flexible duct 3 in the recesses 12. The elongate rod or tool 15 pushes the flexible duct 3 into the recesses 12 such that slack is created in the flexible duct 3.

In particular the slack is created in the region of the radiused edges 11 such that when the flexible duct 3 is inflated, thus coming under tension, the flexible duct 3 does not kink.

FIG. 4 shows the flexible duct 3 in an inflated state within the support structure 1 and cells 4. When the duct 3 is in the inflated state, tension in the flexible duct 3 takes up any excess slack in the duct 3. As the excess slack is taken up in the duct 3, the flexible duct 3 is pulled from the recesses 12 as shown in FIG. 4. In the inflated state the duct 3 contacts the radiused edges 11 on the inner supporting face 7 and is supported by the elongate facet 10.

The support structure 1 is dimensioned such that the cells 17 positioned on the end of each row of the array have substantially the same thermal contact area with the duct 3 as cells located in the centre of the array. This is advantageous as it promotes a more even temperature distribution throughout the battery pack 2 thereby extending the life of the battery pack 2. The support structure 1 achieves this by shielding or thermally insulating a portion of the end cells 17 from thermal contact with the duct 3 such that the duct 3 has substantially the same thermal contact area with the end cells 17 as cells located within the array.

As shown in FIGS. 2 to 4, the ends of the outer supporting face 9 abut the end cells 17 such that the outer bend of the guide path 5 is defined by the outer supporting face 9 from the point the duct 3 emerges from the array to the point that the duct 3 re-enters the array. The outer supporting face 9 prevents the duct 3 expanding such that it wraps around the exterior of the cells 17 which would cause the end cell 17 to have an increased thermal contact with the duct 3.

Similarly, one end 18 of the inner supporting face 7 abuts an end cell 17 as shown in FIGS. 2 to 4. The end 18 of the inner supporting face 7 in abutment with the end cell 17 provides support to the duct 3 thereby preventing the duct 3 bulging and wrapping around the end cell 17.

The other end portion 19 of the inner supporting face 7 partially follows the surface of another end cell 17 such that the end portion 19 wraps around the end cell 17 to form a thermal insulating barrier. The end portion 19 of the inner supporting face 7 partially wraps around the exterior surface of the end cell 17 such that when the duct 3 is located within the guide path 5 the duct 3 does not contact the end cell 17 in the region of the end portion 19. The skilled reader will understand that the extent to which the portion 19 extends around the end cell 17 is dependent upon the thermal contact between the duct 3 and the cells 4. The portion 19 should extend around the end cell 17 sufficiently to ensure that the duct 3 does not contact the end cell 17 more than any other cell 4 within the array.

The guide path 5 defines a channel for the duct 3 to follow from the point the duct 3 emerges from the array to the point that the duct 3 re-enters the array. The guide path 5 prevents the duct 3 bulging or thermally contacting the cells 17 located at the edge of the array any more than a cell located within the array.

Figure 5:
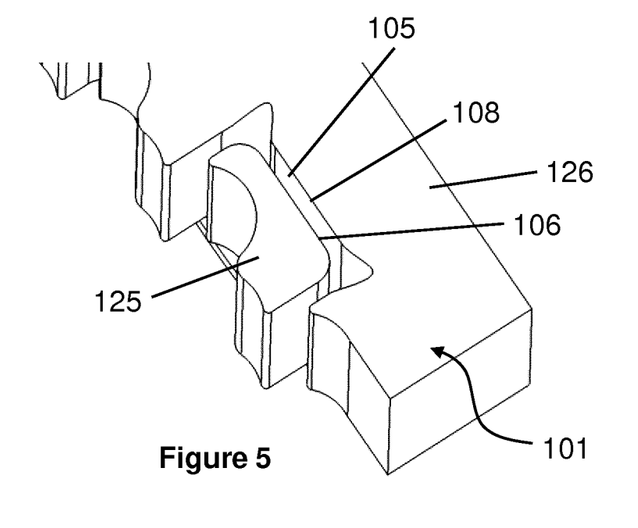
FIG. 5 is a perspective view of a further embodiment of a support structure according to the invention.

Referring now to FIG. 5, there is shown a further embodiment of a support structure indicated generally by reference numeral 101. The support structure 101 is formed from a block of solid material, with a plurality of spaced apart guide paths 105 extending therethrough. The guide paths 105 are substantially the same shape and size as the guide path 5 of the embodiment illustrated in FIGS. 1 to 4. As the support structure 101 comprises a plurality of guide paths 105, the duct 3 can be arranged extending through a first guide path 105, along a first row of cells 4, back along a second row of cells 4 adjacent the first row, and into a second guide path 105 of the same support structure 101. Advantageously, a single support structure 101 can be used to support the duct 3 in more than one location about the battery pack 2 as the duct 3 is arranged around the cells 4 of the battery pack 2.

The support structure 101 has an inner thermally-insulating block 125 that is integrally formed with, and extends away from, the inner guide formation 106 towards the outer cells of the battery pack 2 when in use, such that the volume between the outer cells of the battery pack 2 and the inner guide formation 106 is filled with thermally-insulating material. This further improves the thermal management properties of the duct 3. The support structure 101 further has an outer thermally-insulating block 126 that is integrally formed with and extends outwardly away from the outer guide formation 108. The support structure 101 thereby supports the duct 3 in multiple locations and also thermally-insulates the battery pack 2.

Figure 6:
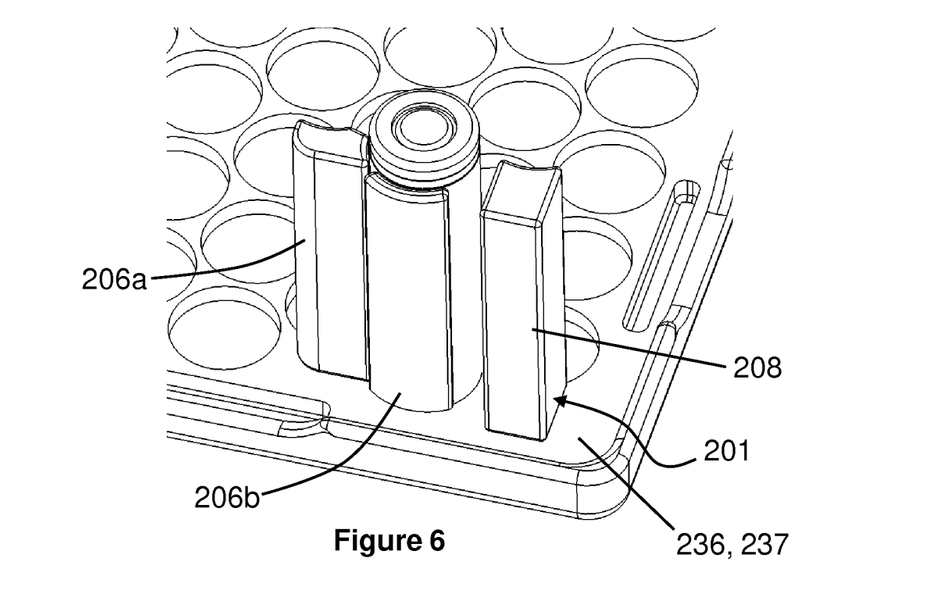
FIG. 6 is a perspective view of a further embodiment of a support structure according to the invention.
Figure 7:
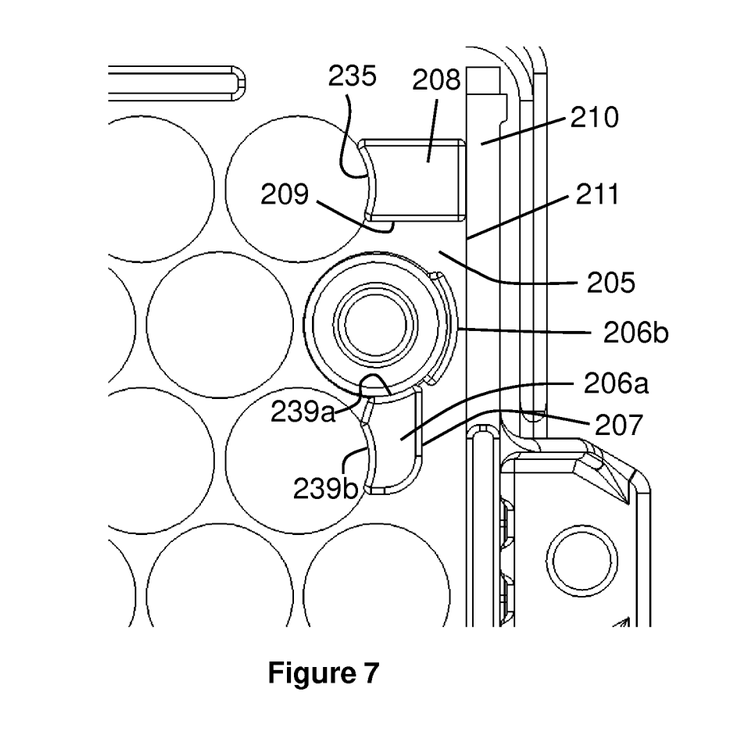
FIG. 7 is a plan view of the support structure of FIG. 6.

Referring now to FIGS. 6 and 7 there is shown a further embodiment of a support structure according to the invention, indicated generally by reference numeral 201. The support structure 201 of this embodiment has an outer guide formation, an inner guide formation and a guide channel 205 therebetween. The support structure 201 is used to prevent a flexible duct from kinking, bulging and/or bursting when the duct changes direction.

The support structure 201 is dimensioned such that the cells positioned on the end of each row of the array have substantially the same thermal contact area with the duct as cells located in the centre of the array. This is advantageous as it promotes a more even temperature distribution throughout the battery pack thereby extending the life of the battery pack. The support structure 201 achieves this by shielding or thermally insulating a portion of the end cells from thermal contact with the duct such that the duct has substantially the same thermal contact area with the end cells as cells located within the array.

The outer guide formation of support structure 201 is formed by the combination of an outer upstand 208 and the inner surface 211 of a wall 210 of the outer pack casing (see FIG. 7). The outer upstand 208 is located adjacent to at least one cell at the edge of the array of cells. The outer upstand 208 is a block that has a cell-abutting face 235 which is curved to match the shape of a cell sidewall, and an outer supporting face 209 which extends from the cell-abutting face 235. The outer upstand 208 is integrally formed with the lower clamshell 237 of the battery pack housing 236.

The inflatable duct is supported by both the outer supporting face 209 of the upstand 208 and the inner surface 211 of the battery pack wall 210. Using the battery pack wall 210 as part of the outer guide formation removes the need for a larger support structure and therefore reduces the width of, and eliminates dead-space within, the battery pack. Ultimately the battery pack can incorporate more cells within a fixed volume, increasing volumetric and gravimetric energy density of the pack.

The outer supporting face 209 of upstand 208 prevents the duct expanding such that it would wrap around the exterior of an end cell, causing the end cell to have an increased thermal contact with the duct.

The inner guide formation of support structure 201 is formed by a combination of an inner upstand 206a and an interface portion 206b. The inner upstand 206a is similar in construction to the outer upstand 208. The inner upstand 206a is a block that is integrally formed with the lower clamshell 237 of battery pack housing 238. The inner upstand 206a is located on the opposing side of the guide channel 205 to the outer guide formation. The inner upstand 206a has two curved cell-abutting faces 239a, 239b for abutting two adjacent, spaced apart cells.

The inner upstand 206a further has an inner supporting face 207 that extends between the cell-abutting faces 239a, 239b. The inner supporting face 207 of the inner upstand 206a has a substantially planar portion and a substantially curved portion that extends from the substantially planar portion towards the sidewall of a cell. The inner supporting face 207 provides support to the duct 3 thereby preventing the duct 3 bulging and wrapping around an end cell.

The interface portion 206b is provided by a compressible pad adhered to the surface of a cell. Specifically, the pad is open-cell polyvinyl chloride (PVC) tape. Alternatively, closed-cell PVC or polyurethane foam could be used, or other suitable compressible material. In use, the interface portion 206b of the inner guide formation extends from a cell-abutting face 239a of the first part 206a and around a portion of the cell to which it is adhered. When the flexible duct (not shown) is inflated it presses against the inner upstand 206a and an interface portion 206b of the inner guide formation.

The interface portion 206b is used to limit the thermal contact between the duct and the peripheral cell to which it is attached. The interface portion 206b wraps around the exterior surface of an end cell such that when the duct is located within the guide path 205 the duct does not contact the end cell in the region of the interface portion 206b. The skilled reader will understand that the extent to which the interface portion 206b extends around the end cell is dependent upon the required thermal contact between the duct and the cells. The interface portion 206b should extend around the end cell sufficiently to ensure that the duct does not contact the end cell more than any other cell within the array.

The skilled person will appreciate that both of the inner upstand 206a and an interface portion 206b may be compressible and/or may be integrally connected to one another. Interface portion 206b may be integrally formed with the lower clamshell 237.

Figure 8:
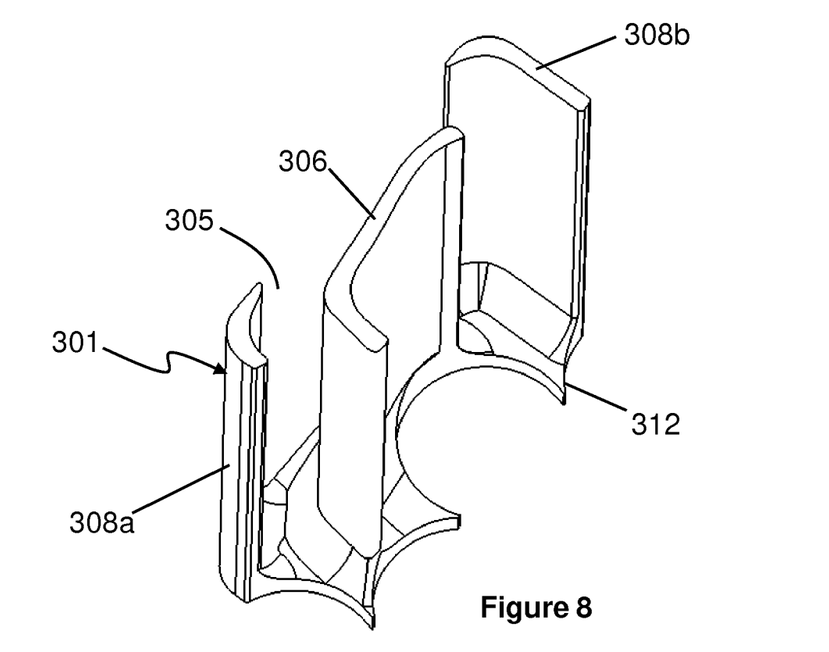
FIG. 8 is a perspective view of a further embodiment of a support structure according to the invention.
Figure 9:
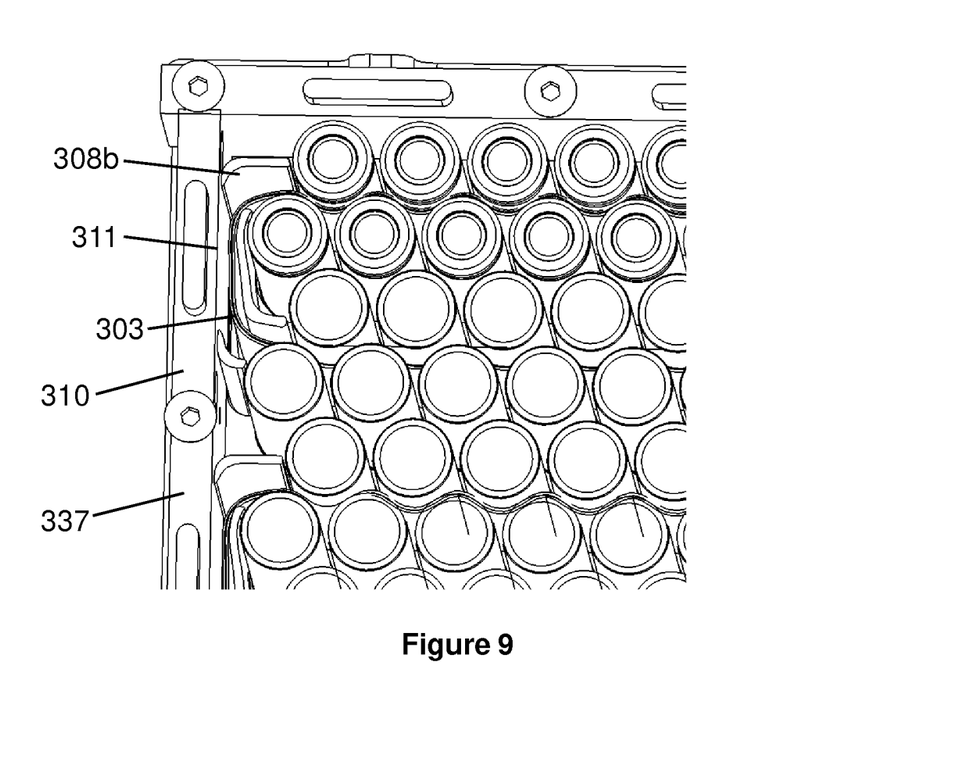
FIG. 9 is a perspective view of the support structure of FIG. 8 installed within a battery pack.
Figure 10:
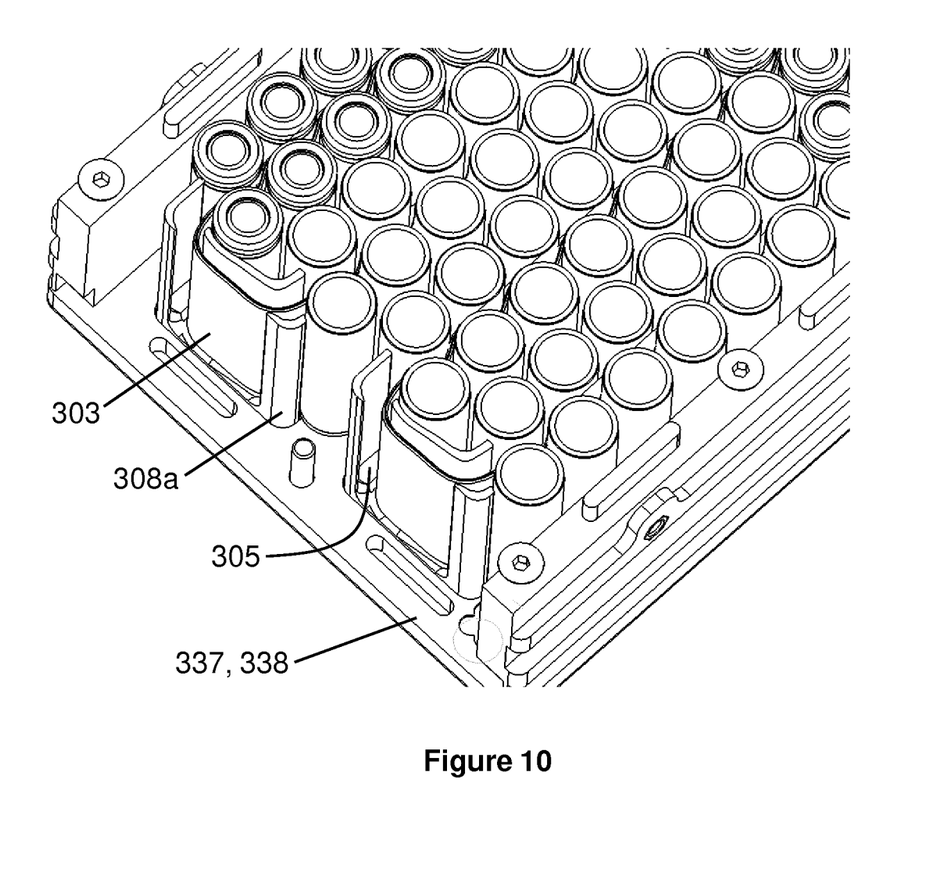
FIG. 10 is an additional perspective view of the support structure of FIG. 8 installed within a battery pack.

Referring now to FIGS. 8 to 10 there is shown a yet further embodiment of a support structure according to the invention, indicated generally by reference numeral 301. The support structure 301 of this embodiment has an outer guide formation 308, an inner guide formation 306 and a guide channel 305 therebetween. The support structure 301 is used to prevent a flexible duct from kinking, bulging and/or bursting when the duct changes direction.

The support structure 301 is dimensioned such that the cells positioned on the end of each row of the array have substantially the same thermal contact area with the duct as cells located in the centre of the array. This is advantageous as it promotes a more even temperature distribution throughout the battery pack thereby extending the life of the battery pack. The support structure 301 achieves this by shielding or thermally insulating a portion of the end cells from thermal contact with the duct such that the duct has substantially the same thermal contact area with the end cells as cells located within the array.

The outer guide formation of support structure 301 is formed by the combination of a first outer upstand 308a, a second outer upstand 308b and the inner surface 311 of a wall 310 of the outer pack casing (see FIG. 9). The first and second upstanding structures 308a, 308b are spaced apart and both are connected to a support structure base 312. The lower clamshell 337 of the battery pack housing 338 may include appropriate recesses to accommodate the support structure base 312 at the edge of the array of cells although in optional embodiments the support structure 301 may be integrally formed with the lower clamshell 337.

The inflatable duct is supported by the first outer upstand 308a, the second outer upstand 308b and the inner surface 311 of the battery pack wall 310. Using the battery pack wall 310 as part of the outer guide formation removes the need for a larger support structure and therefore reduces the width of, and eliminates dead-space within, the battery pack. Ultimately the battery pack can incorporate more cells within a fixed volume, increasing volumetric and gravimetric energy density of the pack.

The upstanding structures 308a, 308b are curved and define corners of the guide formation 305. The gap between the upstanding structures 308a, 308b can be used to pull excess amounts of the duct through the support structure 301 when arranging the duct in the battery pack.

The first outer upstand 308a the second outer upstand 308b prevent the duct expanding such that it would wrap around the exterior of an end cell causing the end cell to have an increased thermal contact with the duct.

The inner guide formation 306 is generally similar to the inner guide formation 6 shown in e.g. FIGS. 2 to 4 and may be attached to the support structure base 312 or integrally formed with the lower clamshell of the battery pack.

In use, the support structure 1, 101, 201, 301 is arranged at a location on the battery pack 2 where the duct 3 changes direction, such as at the edge of the battery pack 2. The uninflated duct 3 is arranged between the cells 4 and is inserted into the guide formation 5, 105, 205, 305. An elongate tool 15 such as a screwdriver is inserted into the guide formation 5, 105, 205, 305 and used to urge the uninflated duct 3 into the recesses 12 thereby generating slack within the guide formation 5, 105, 205, 305. The duct 3 is then inflated by pumping a fluid through the duct 3. The duct 3 moves away from the recesses 12 and extends around the inner guide formation 6, 106, 206, 306, which is compressed by the duct 3. The support structure 1, 101, 201, 301 retains the inflated duct away from the outer cells 17 such that they are not exposed to a greater amount of the duct 3 than any other cell 4 in the array. The support structure 1, 101, 201, 301 further prevents the duct 3 from kinking as it changes direction where the duct 3 exits the array and returns back into the array.

Further within the scope of the invention is a battery pack 2 having a plurality of cells 4 and a support structure 1, 101, 201, 301 configured to provide support to a flexible duct 3, the flexible duct being arrangeable proximal to (i.e. adjacent to and/or between) the cells 4 to thermally manage the cells 4, and where the support structure 1, 101, 201, 301 is configured to prevent kinking of the duct 3 when the duct changes direction.

Yet further within the scope of the invention is a thermal management arrangement 30 for a battery pack 2, wherein the battery pack 2 has a plurality of cells 4 and where the thermal management arrangement 30 has a flexible duct 3 configured to be placed around the cells 4 of the battery pack to and carry a fluid to thermally manage the battery pack 2. The thermal management arrangement 30 further has a support structure 1, 101, 201, 301 configured to provide support to the flexible duct 3 to prevent the duct 3 kinking when the duct 3 changes direction.

The fluid within the duct 3 can be a coolant fluid used to thermally manage the cells 4 via heating and/or cooling. The duct 3 is pressurised by the fluid to an inflated state as shown in FIG. 4. When in the inflated state, the duct 3 is in conformity with the surface of the cells 4. This improves the thermal contact between the duct 3 and the cells 4 such that the fluid may transfer thermal energy between the fluid and the cells 4 more efficiently. The duct 3 further secures the cells 4 in position when in the inflated state. This improves the connection of the cells 4 in the battery pack 2. Furthermore, when the battery pack 2 is being used in an automotive or aerospace application where it is subject to vibration, the duct 3 may reduce the effects of vibrations on the battery pack 2 by securing the individual cells 4 in place.

The thermal management arrangement 30 further involves a potting material 231 in the form of a thermally insulating foam located within the battery pack. The potting material/thermally insulating foam prevents a high energy thermal event propagating through the battery pack 2 and reduces the effect of external temperature fluctuations on the battery pack 2, helping to ensure that the duct 3 is the primary controller of thermal energy within the battery pack 2.

During construction of the battery pack, the potting material/thermally insulating foam 231 is poured into the battery pack while the duct is in the inflated state located within the support structures 1, 101, 201, 301 and between/adjacent to the cells 4. The thermally insulating foam is expandable sets rigid such that it secures the cells 4 and the duct 3 in position within the battery pack 2. This is advantageous as it reduces the effects of vibrations on components within the battery pack 2 and it acts as a support for the duct 3. When the foam sets rigid it surrounds the inflated duct 3 and provides external support to the duct 3 thus preventing excessive expansion and potentially, bursting of the duct 3. The thermally insulating foam also acts as an adhesive.

The thermal management arrangement 30 further has an outer casing (not shown) for the battery pack 2. The thermally insulating foam secures the outer casing to the battery pack 2 by adhering the outer casing to the battery pack 2. This beneficially reduces or negates the requirement for additional fixings or fasteners which reduces the complexity of the battery pack 2 and improves the manufacturing process. The thermally insulating foam is polyurethane foam.

The support structures 1, 101, 201, 301 can be made from any suitable rigid, semi-rigid or compressible material which has sufficient rigidity to support a flexible duct 3, for example metal, plastic or rubber. In an important example, the support structures 1, 101, 201, 301 are made from the potting material used within the battery pack 2 or possess similar thermal propagation prevention properties as the bulk potting compound. For example, the support structures 1, 101, 201, 301 can be manufactured by pouring a potting material into a suitable mould, or by cutting out a support structure from e.g. a block of pre-cured thermally insulating foam.

As noted above, the support structures 1, 101, 201, 301 are used to prevent the duct 3 kinking, bulging and/or bursting when the duct 3 is in its inflated state and changes direction. After the duct has been placed within the array of cells and within the support structures 1, 101, 201, 301, potting material is poured into the battery pack while the duct is in the inflated state. In cases where the potting material is thermally insulating or polyurethane foam, the potting material expands to surround and support the inflated duct in places where it is not supported by a support structure and/or is not in contact with the sidewall of a cell. In cases where the support structures 1, 101, 201, 301 are made from thermally insulating foam, once the potting material within the battery pack has cured or hardened then there will be a seamless interface between the support structure and the potting material within the pack. Advantageously, the support structures 1, 101, 201, 301 and potting material will have the same thermal insulating properties.

In alternatives, the support structure 1, 101, 201, 301 can be integrally formed with the walls of the battery pack 2, for example with either of the upper or lower clamshell. In such examples the support structures 1, 101, 201, 301 are extrusions from the plastic shells as opposed to an insert within the battery pack 2. The lower clamshell and/or upper clamshell can comprise a plurality of circular recesses, each recess being configured to receive an end portion of a respective cylindrical cell. The recesses are arranged in a close-packed array for holding the array of cells in place within the pack. Apertures in the recesses allow the cells to be electrically connected to busbars on the upper and/or lower clamshell.

The duct 3 is to be formed from an inflatable plastics material such as low-density polyethylene (LDPE), linear low-density polyethylene (LLDPE) or high-density polyethylene (HDPE). An inflatable plastics material is advantageous as the material is intrinsically electrically insulating, lightweight and does not corrode or chemically interact with a coolant such as a glycol water mix. The duct wall is thin thereby allowing good thermal transfer properties between the duct 3 and the cells 4. For example, the duct wall may be between 50 μm and 150 μm thick. The thermal management arrangement has a reservoir (not shown) in fluid communication with the duct 3.

The thermal management arrangement 30 further has a coolant loop (not shown). The coolant loop is in fluid communication with the reservoir. The reservoir contains a coolant fluid and provides hydrostatic pressure to coolant fluid in the coolant loop. The thermal management arrangement further has a pump (not shown) for pumping fluid through the duct 3. The pump is configured to pump coolant from the reservoir to the coolant loop to pressurise the coolant loop. Coolant fluid in the reservoir can thereby be used to pressurise the thermal management arrangement 30. This allows the pressure to be maintained within the thermal management arrangement 30 such that the pressure is maintained at a target operating pressure. The thermal management arrangement 30 has a pressure sensor to monitor the pressure of the fluid such that a target operating pressure is maintained.

The cells 4 are cylindrical cells, most preferably 18650 or 2170 lithium ion cells. The thermal management arrangement 30 is well suited for use with cylindrical cells as the duct 3 can expand and conform to the undulating surface of the cylindrical cells. This is advantageous as it improves the thermal contact between the cells and the duct. The height of the support structures 1, 101, 201, 301 may be substantially equal to the height of the cells. The height of the duct, in its inflated state, may be equal to or less than the height of the cells.

In example embodiments (not shown), the duct is a multi-lumen duct having two or more lumens along which coolant fluid may flow. A multi-lumen duct may be used in large battery packs where a single lumen duct is not capable of promoting an even temperature distribution. Advantageously, a multi-lumen duct may be used in combination with the support structure 1, 101, 201, 301 to prevent the multi-lumen duct kinking. Furthermore, the multi-lumen duct may be pressurised such that it expands and conforms to the cells in a similar manner to that of the single lumen duct.

Figure 11:
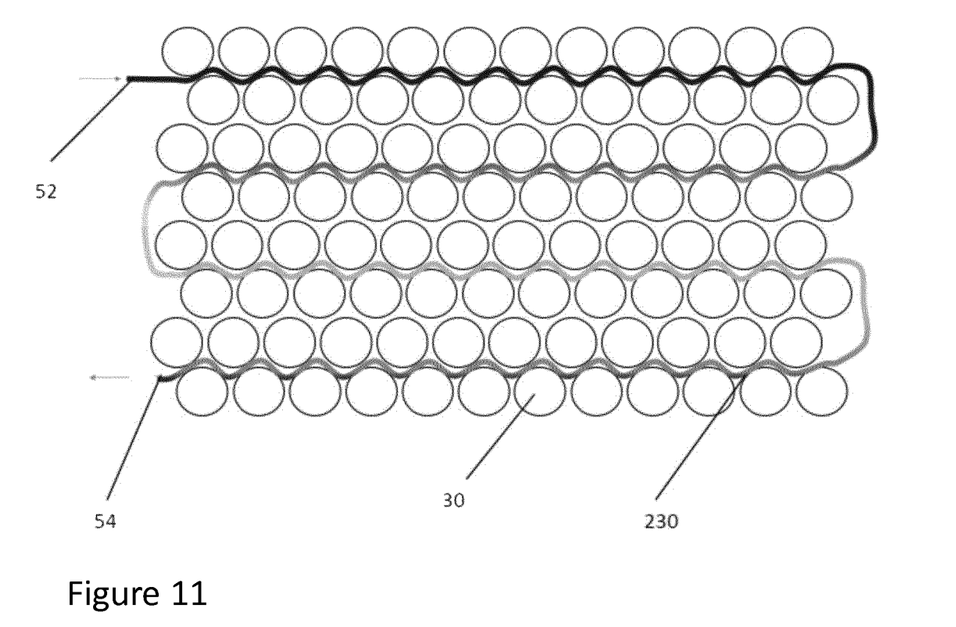
FIG. 11 is a top plan view of an array of cells and a serpentine duct with duct wall thickness varying along the length of the duct.
Figure 12:
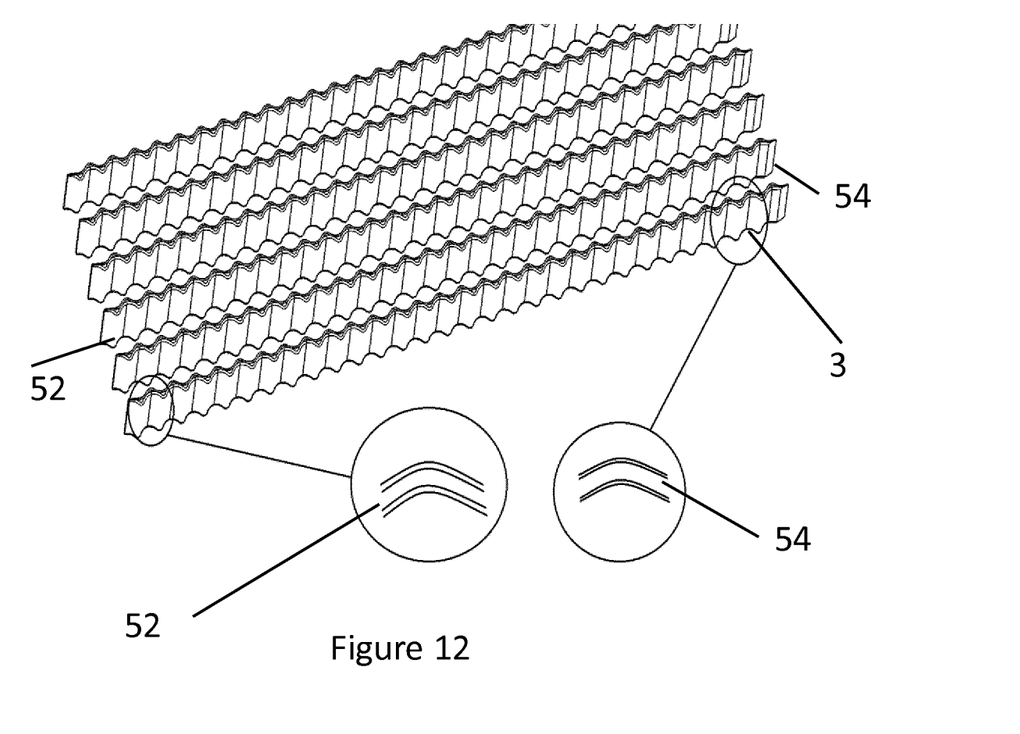
FIG. 12 is a section view of a part of the duct of FIG. 11.

Referring to the drawings and initially to FIGS. 11 to 12, there is shown a duct 230/3 capable of engaging at least part of a surface area of a heat source 17/30, the duct 230/3 extending along and engageable with at least part of the surface area of the heat source 17/30 along all or part of the length of the heat source 17/30 from a first engagement position after inlet 52 to at least one final engagement position after outlet 54 between the duct 230/3 and heat source 17/30. A heat transfer fluid flows along an internal conduit of the duct 230/3 such that heat can be transferred between the duct 230/3 and the heat source 17/30 via the heat transfer fluid about the engageable surface areas of the duct 230/3 and the heat source 30/17. The duct 230/3 is adapted to allow variable thermal transfer via the heat transfer fluid between the engageable surface areas of the duct 230/3 and the heat source 30/17.

The duct 230/3 is adapted to allow variable thermal transfer via the heat transfer fluid between the engageable surface areas of the duct 230/3 and the heat source 30/17 along the length of the duct 230/3.

Advantageously, the duct 230 being adapted to allow variable thermal transfer via the heat transfer fluid between the engageable surface areas of the duct 230 and the heat source 17/30 along the length of the duct 230 compensates for the variation in temperature of the heat transfer fluid as a result of ongoing thermal transfer as the heat transfer fluid flows along the length of the duct 230. This ensures uniform thermal transfer between the heat source 17/30 and the duct 230 via the heat transfer fluid along the length of the duct 230 as other parameters such as fluid temperature vary. The heat source 17/30 comprises a battery pack 2 comprising a plurality of cells 17/30. The duct 230 is a flexible duct.

The duct 230 is positioned proximally to the surface of the heat source 17/30 such that heat can be exchanged between the duct 230 and the heat source 17/30. The duct 230 is positioned proximally to the surface of the cells 17/30 such that heat can be exchanged between the duct 230 and the cells 17/30.

Figure 13:
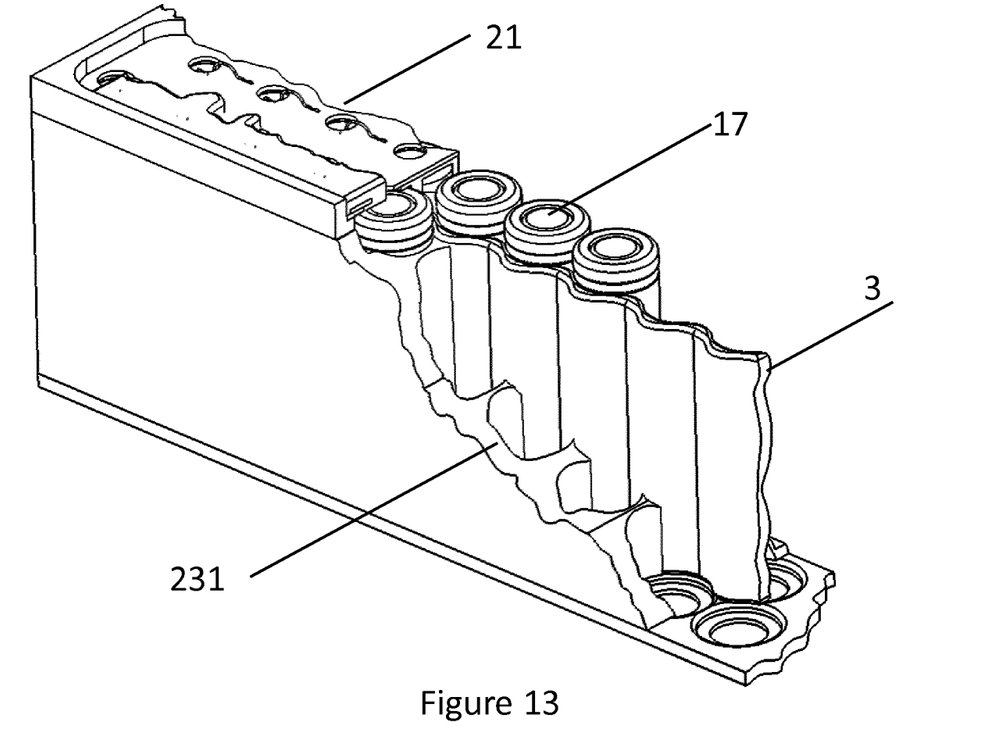
FIG. 13 is a cutaway perspective view of a part of a battery pack showing the potting material.

In one embodiment, where the duct 230/3 is a flexible duct 3/230, a potting material 231 see FIG. 13 is provided adapted to act as a support for at least a part of the duct 230. Advantageously the flexible duct 3/230 can closely conform to the surface shape of the heat source/cells 17/30 within the pack 2 while being reinforced by the potting material 231 which acts to prevent the flexible duct 3/230 from over inflation and/or bursting.

The duct 3/230 is configured to carry the heat transfer fluid from an inlet 52 to an outlet 54 to transfer thermal energy between the heat source/cells 17/30 and the duct 3/230 at their engageable contact surfaces via the heat transfer fluid and wherein the thermal resistance of the duct 230 at the inlet 52 is higher than the thermal resistance of the duct at the outlet 54. This is advantageous as varying the thermal resistance of the duct 3/230 along the length of the duct 230 promotes a uniform temperature distribution across the heat source/battery pack 2. In particular, having a higher thermal resistance at the inlet to the duct 230 prevents over cooling or heating of heat source/cells 17/30 located proximal to the inlet 52 where the temperature differential between the heat transfer fluid and the heat source/cells 17/30 is at its greatest. The thermal resistance of the duct 230/3 is varied linearly or non-linearly along the length of the duct 230/3 such that the thermal resistance of the duct 230 decreases as the temperature differential between the heat transfer fluid and the heat source/cells 17/30 also decreases, thereby promoting uniform power dissipation along the length of the duct 230.

In one embodiment the wall thickness of the duct 230/3 may be thicker at the inlet 52 compared to the outlet 54 as illustrated in FIG. 12 where a vertical section through the duct 230 at the outlet and the inlet is shown illustrating the variation in duct wall thickness. This is advantageous as increasing the wall thickness also increases the thermal resistance of the duct 230. As such increasing the wall thickness of the duct 230 at the inlet also increases the thermal resistance of the duct 230.

In an embodiment the wall thickness of the duct may vary linearly along the longitudinal length of the duct 3/230. In another embodiment the wall thickness of the duct 230 may vary non-linearly along the longitudinal length of the duct 230. Varying the wall thickness of the duct 230 along the longitudinal length of the duct 230 has the effect of varying the thermal resistance of the duct 230 along its longitudinal length.

In an embodiment the wall thickness may be varied such that a substantially constant power dissipation is achieved along the longitudinal length of the duct 230/3. This is advantageous as it promotes an even temperature distribution throughout the array of cells 17/30. This may be achieved by increasing the thermal resistance along the length of the duct 230.

Figure 14:
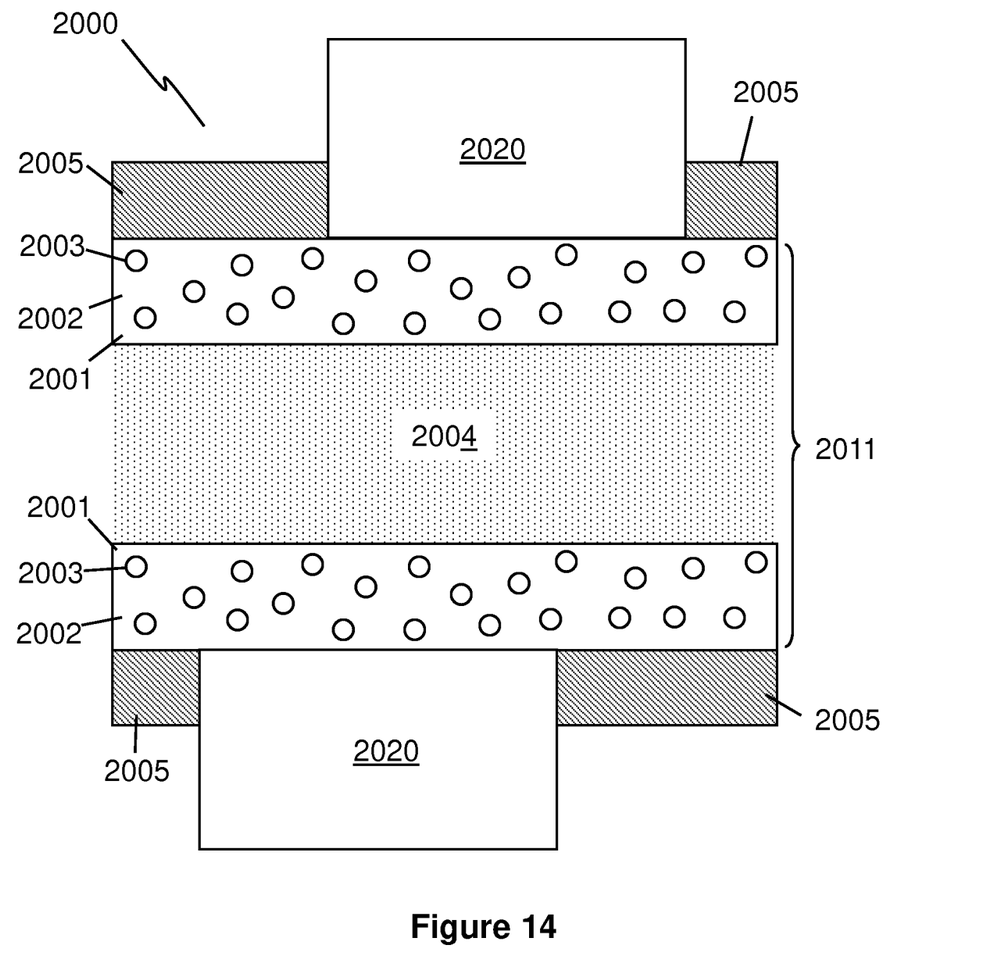
FIG. 14 is a cross sectional schematic view of a duct wherein the duct material comprises a matrix and a filler.

In FIG. 14 there is shown a schematic cross section of a battery pack indicated generally by the numeral 2000. The battery pack 2000 includes a duct 2011 used to thermally manage cells 2020. The duct 2011 comprises flexible duct material 2001 comprising a matrix 2002 and a filler 2003. The flexible duct carries a fluid 2004 such as air, water or a water-glycol mixture. Heat is transferred between cells 2020 and the coolant 204 via the duct material 2001.

The matrix 2002 is a flexible plastic or polymer material, in this case LDPE, LLDPE, HDPE polyester, silicone or rubber. The matrix 2002 is electrically insulating. The matrix 2002 has a thermal conductivity less than 15 $Wm^{-1}K^{-1}$, ideally less than 10 $Wm^{-1}K^{-1}$, 5 $Wm^{-1}K^{-1}$ and/or 1 $Wm^{-1}K^{-1}$.

The filler 2003 comprises particles of a filler material and these are dispersed throughout the matrix 2002. In preferred embodiments the filler 2003 comprises NANOCYL (RTM) NC7000 series thin multiwall carbon nanotubes however any suitable filler material may be used such as a carbon-based filler material such as carbon, carbon black, graphite, graphite platelets graphene, multi-walled carbon nanotubes or single-wall carbon nanotubes or a ceramic filler material such as aluminium oxide, silicon carbide, boron nitride, silicon nitrate, alumina, aluminium nitride or zinc oxide. The particles of filler material may be elongate and tubular having a diameter of 1-10 nm and a length of 0.5-5 nm. Alternatively the particles of filler may be substantially spherical with an average diameter of between 1 nm and 10 µm.

The thermal conductivity of the filler 2003 is greater than the thermal conductivity of the matrix 2002. Ideally the filler 2003 has a thermal conductivity greater than 10 $Wm^{-1}K^{-1}$ and/or greater than 100 $Wm^{-1}K^{-1}$. The duct material 2001 comprises less than 25% by volume of filler 2003, ideally 5-18% by volume of filler or 15% by volume of filler 2003. Incorporating a limited amount of filler 2003 into the matrix provides an increased thermal conductivity while maintaining a low electrical conductivity and favourable mechanical properties (i.e. suitable flexibility for an inflatable duct).

In this example, the duct material 2001 has a thermal conductivity greater than 0.33 $Wm^{-1}K^{-1}$ at room temperature, ideally greater than 1 $Wm^{-1}K^{-1}$ and/or 10 $Wm^{-1}K^{-1}$. This means that the heat transfer through the duct material 2011 is better than a conventional polymer duct. The duct material 2001 itself is electrically insulating, since the electrical conductivity of the duct material 2001 is dominated by the electrical properties of the non-conductive matrix 2002. The electrically insulating nature of the duct material/matrix significantly reduces the risk of short circuits when compared with a metallic duct.

The duct 2011 is at least partially surrounded by a potting material 2005 which acts to reinforce the duct 2011 at places where it does not contact the wall of a cell 2020. Incorporation of filler 2003 within matrix 2002 can alter the mechanical properties of the duct 2001, particularly for high concentrations of filler 2003. Where this leads to any reduction in mechanical strength the reinforcing material 5 can be used counteract such effects. This embodiment can be used as an alternative or in combination with the variable wall thickness embodiment.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

What is claimed is:

1. A battery pack comprising an array of cells, a flexible, heat-exchanging duct located proximal to cells of the battery pack, and at least one support structure for the duct, the support structure being configured to provide support to the duct to prevent kinking, bulging and/or bursting of the duct at positions where the duct emerges from an array of cells, changes direction and re-enters the array of cells, the support structure comprising an inner guide formation, and outer guide formation and a guide path located between the inner guide formation and the outer guide formation.

2. A battery pack as claimed in claim 1, wherein the support structure is dimensioned such that cells positioned on an end of each row of the array have substantially the same thermal contact area with the duct as cells located in a centre of the array and wherein the support structure is shaped such that one end of an inner supporting face abuts an end cell.

3. A battery pack as claimed in claim 2 wherein the support structure is shaped such that an other end portion of the inner supporting face partially follows a surface of another end cell such that the other end portion wraps around the other end cell to form a thermal insulating barrier.

4. A battery pack as claimed in claim 2 wherein the support structure is shaped such that at least one end of an outer supporting face abuts a cell.

5. A battery pack as claimed in claim 1, wherein the support structure is adapted to guide the flexible duct smoothly through one or more 90° bends.

6. A battery pack as claimed in claim 1, wherein the guide path is configured such that the duct follows the guide path from a point that the duct emerges from the array to a point that the duct re-enters the array when in use.

7. A battery pack as claimed in claim 1, wherein the guide path is a slot or channel into which the flexible duct may be inserted and that the flexible duct then follows so as to change direction without kinking.

8. A battery pack as claimed in claim 7, wherein the channel provides support to the duct on both sides.

9. A battery pack as claimed in claim 1, wherein the inner guide formation is located on an inside of a turn of the flexible duct.

10. A battery pack as claimed in claim 9, wherein the inner guide formation has an inner supporting face that is located between a cell and the flexible duct when in use.

11. A battery pack as claimed in claim 6, wherein the inner guide formation is dimensioned such that a bend radius of the inner supporting face is large enough to guide the flexible duct smoothly through 180° without the duct kinking.

12. A battery pack as claimed in claim 10, wherein the inner supporting face is discontinuous.

13. A battery pack as claimed in claim 10, wherein the inner supporting face comprises a planar elongate facet between two radiused edges.

14. A battery pack as claimed in claim 9, wherein the support structure comprises an inner thermally-insulating block that extends away from the inner guide formation.

15. A battery pack as claimed in claim 9, wherein at least part of the inner guide formation is compressible.

16. A battery pack as claimed in claim 1, wherein the outer guide formation has an outer supporting face.

17. A battery pack as claimed in claim 16, the support structure comprising an outer thermally-insulating block that extends outwardly and away from the outer guide formation.

18. A battery pack as claimed in claim 16, wherein the outer supporting face is discontinuous.

19. A battery pack as claimed in claim 1, wherein the support structure comprises at least one recess or opening configured to partially receive the duct in an uninflated state such that slack is created in the duct.

20. A battery pack as claimed in claim 1, wherein the support structure is configured to provide a thermal barrier between at least one cell and the duct when in use.

21. A battery pack as claimed in claim 1, wherein the support structure is configured to be located within the battery pack at positions where the duct changes direction.

* * * * *